(12) United States Patent
Wilton

(10) Patent No.: US 8,534,437 B2
(45) Date of Patent: Sep. 17, 2013

(54) CENTRIFUGALLY BALANCED HYDRAULIC CLUTCH ASSEMBLY

(75) Inventor: Daryl A. Wilton, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/964,302

(22) Filed: Dec. 9, 2010

(65) Prior Publication Data

US 2012/0145511 A1    Jun. 14, 2012

(51) Int. Cl.
*F16D 25/10* (2006.01)

(52) U.S. Cl.
USPC ............ 192/48.619; 192/85.25; 192/106 F

(58) Field of Classification Search
USPC ............ 192/48.619, 85.25, 106 F, 85.44, 192/48.618, 85.27, 85.29, 48.601; 475/146
See application file for complete search history.

(56) References Cited

U.S. PATENT DOCUMENTS

| | | | | |
|---|---|---|---|---|
| 5,421,439 A | * | 6/1995 | Hayasaki | 192/85.25 |
| 5,950,787 A | * | 9/1999 | Murasugi et al. | 192/85.25 |
| 6,523,657 B1 | * | 2/2003 | Kundermann et al. | 192/48.8 |
| 7,001,301 B2 | * | 2/2006 | Wittkopp | 475/146 |
| 7,350,633 B2 | * | 4/2008 | Portell et al. | 192/85.29 |
| 2005/0217962 A1 | * | 10/2005 | Pedersen et al. | 192/85 AA |
| 2010/0075794 A1 | * | 3/2010 | McConnell et al. | 475/146 |

* cited by examiner

*Primary Examiner* — David D Le
*Assistant Examiner* — Stacey Fluhart
(74) *Attorney, Agent, or Firm* — Quinn Law Group, PLLC

(57) ABSTRACT

A centrifugally balanced hydraulic clutch assembly includes a hydraulic chamber configured to rotate about an axis of rotation and a clutch piston that is partially situated within the hydraulic chamber and defines both an apply volume and a release volume. The clutch piston includes an inner surface and an outer surface, where a portion of the outer surface faces the apply volume and defines an apply area, and a portion of the inner surface faces the release volume and defines a release area. Additionally each portion of the apply area is provided at a respective distance from the axis of rotation, and, for each portion of the apply area, there is a corresponding portion of the release area provided at the same radial distance.

6 Claims, 5 Drawing Sheets

CENTRIFUGALLY BALANCED HYDRAULIC CLUTCH ASSEMBLY

TECHNICAL FIELD

The present invention relates generally to hydraulic clutch assembly having a radially stacked piston configuration.

BACKGROUND

Clutch assemblies may be used to selectively engage one or more output shafts to rotate synchronously with the rotation of an input shaft. Many clutch assemblies operate by interlocking a plurality of clutch friction plates that are connected between an input shaft and an output shaft. The plates may be arranged to form a clutch sub-assembly. When pressure is applied to the clutch plate arrangement, the clutch input plates are frictionally engaged with the clutch output plates, causing the output plates to move synchronously with the input plates.

In such clutch assemblies, the clutch friction plates of the clutch sub-assembly may be engaged via an applied pressure from an actuator. The actuator may be engaged through the application of a hydraulic force. Such a hydraulic force may apply a compressive pressure to the clutch plates.

SUMMARY

A centrifugally balanced hydraulic clutch assembly includes a hydraulic chamber configured to rotate about an axis of rotation and a clutch piston that is partially situated within the hydraulic chamber and defines both an apply volume and a release volume. The clutch piston includes an inner surface and an outer surface, where a portion of the outer surface faces the apply volume and defines an apply area, and a portion of the inner surface faces the release volume and defines a release area.

Each portion of the apply area may be provided at a respective distance from the axis of rotation, and, for each portion of the apply area, there is a corresponding portion of the release area provided at the same radial distance. Additionally, the apply area may be configured to extend to an extreme radial dimension that is substantially aligned with an extreme radial dimension of the release area.

The clutch piston may include an inflection feature that may align a portion of the inner surface of the clutch piston with a surface of the hydraulic chamber that defines an extreme radial dimension of the apply area. The clutch piston may further include a seal adjacent the outer surface that is configured to contact the surface of the hydraulic chamber. In an embodiment, the seal may define a boundary of the apply volume.

The assembly may further include a second hydraulic chamber that is configured to rotate about the axis of rotation, along with a second clutch piston that is partially situated within the second hydraulic chamber and which defines a second apply volume and a second release volume. The first and second release volumes may be fluidly connected, such as through a fluid port. The assembly may include a volume adjacent the outer surface of the clutch piston that is isolated from the apply volume by a seal. The isolated volume may be vented by a relief port provided within a portion of the clutch piston.

The assembly may also include a clutch sub-assembly, where the application of a pressure to the apply area of the clutch piston may urge the clutch piston to translate in an engaging direction and towards the clutch sub-assembly. The clutch piston may include an actuator portion and a hydraulic portion, where the actuator portion is configured to interface with the clutch sub-assembly.

The above features and advantages and other features and advantages of the present invention are readily apparent from the following detailed description of the best modes for carrying out the invention when taken in connection with the accompanying drawings.

DETAILED DESCRIPTION

Figure 1:
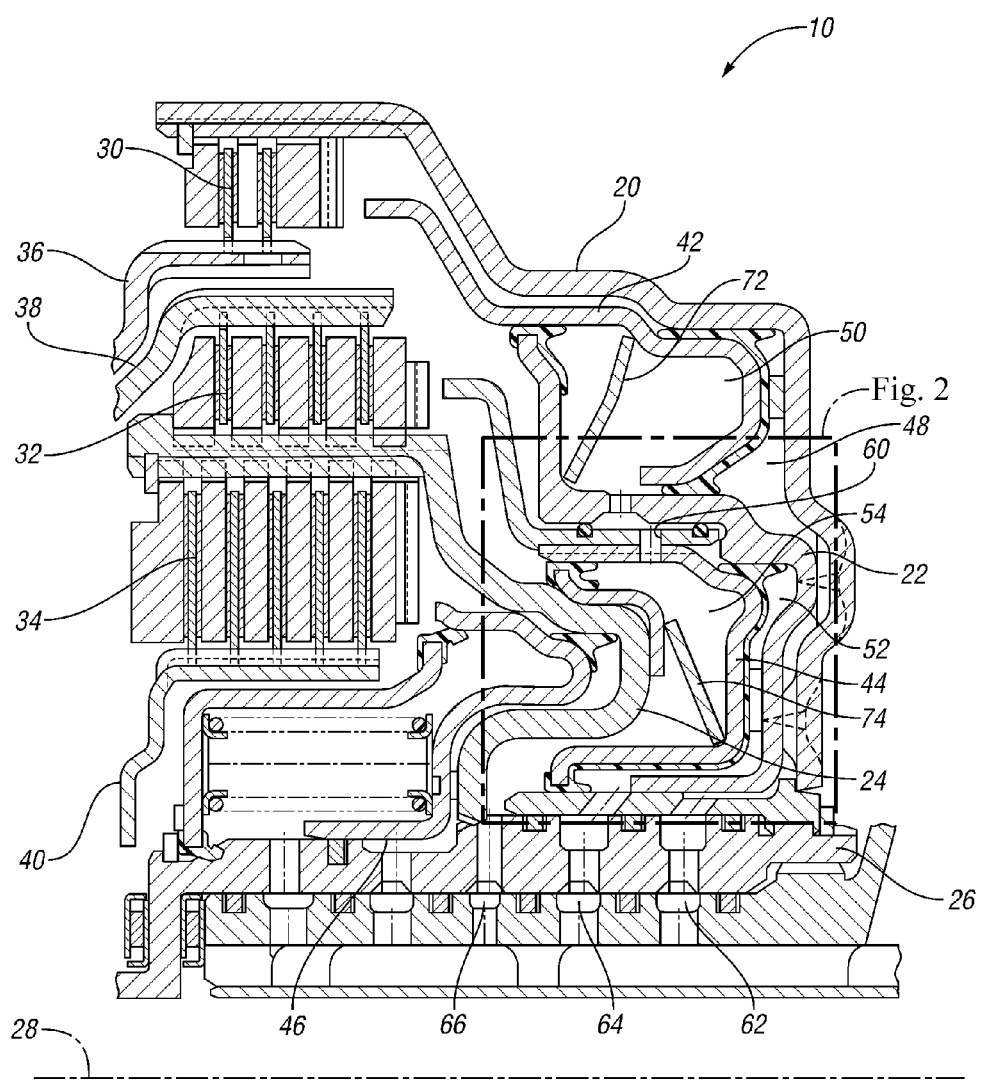
FIG. 1 is a partial schematic cross-sectional view of an embodiment of an automotive powertrain clutch assembly having a stacked clutch piston design.

Referring to the drawings, wherein like reference numerals are used to identify like or identical components in the various views, FIG. 1 illustrates an embodiment of a centrifugally balanced hydraulic clutch assembly 10. The assembly 10 is generally configured to convert one or more rotational inputs into one or more rotational outputs through the selective actuation of one or more clutch sub-assemblies. In the embodiment illustrated in FIG. 1, an outer housing 20, piston dam 22, hub 24, and inner housing 26 may all rotate about a center-axis 28 at an angular speed dictated by the rotation of an input shaft (not shown). The piston housing 20 and hub 24 may each be coupled with one or more respective clutch sub-assemblies (e.g., clutch sub-assemblies 30, 32, and 34), with each clutch sub-assembly coupled to a respective output shaft (e.g., output shafts 36, 38, and 40, respectively). In an embodiment, the output shaft of a respective clutch sub-assembly may rotate in unison with the input shaft when the clutch is engaged, and may not rotate in unison when the clutch is disengaged. To engage a clutch sub-assembly, a piston (e.g., pistons 42, 44, and 46) may apply a force to the clutch that is sufficient to cause a plurality of clutch plates to frictionally interlock. The resulting clamping force between the plates may inhibit plates coupled with the output shaft from slipping past plates coupled with the input shaft. As shown in FIG. 1, for example, a first clutch piston 42 may laterally translate to engage and apply a compressive force to clutch sub-assembly 30. Similarly, a second clutch piston 44 may laterally translate to engage clutch sub-assembly 32, and a third clutch piston 46 may laterally translate to engage clutch sub-assembly 34. In an embodiment, clutch pistons 42, 44 may be configured in a stacked arrangement, where clutch piston 44 (the "inner clutch piston") may be radially positioned between the axis of rotation 28 and clutch piston 42 (the "outer clutch piston").

One or more of the clutch pistons may be hydraulically actuated to engage its respective clutch sub-assembly. In such a configuration, the piston may partially lie within a hydraulic chamber, where it may separate an apply volume from a release volume. For example, as shown in FIG. 1, the outer housing 20 and piston dam 22 may define an outer piston chamber. Within the outer piston chamber, the outer clutch piston 42 may separate an outer apply volume 48 from an outer release volume 50. Likewise, the piston dam 22 and hub 24 may define an inner piston chamber, within which the inner clutch piston 44 may separate an inner apply volume 52 from an inner release volume 54.

Each of the respective apply and release volumes may contain a hydraulic fluid, and may be sealed to prevent the fluid from unintentionally escaping the volume. Furthermore, each fluid may be capable of maintaining a pressure within its respective volume. By altering the relative pressure between the apply and release volumes, a net hydraulic force may be applied to the piston, which, in turn may cause it to move in a pre-determined direction. In an embodiment, each of the inner and outer clutch pistons 44, 42 may be constrained such that they may only translate parallel to the axis of rotation 28.

The outer release volume 50 may be fluidly connected to the inner release volume 54 such that they share a common supply of hydraulic fluid. The fluid connection may be provided by a port 60 that extends through the radially outward wall of the inner clutch piston 44, as well as through a portion of the piston dam 22. In the absence of rotational forces, the outer and inner release volumes 50, 54 may be pressurized to a common pressure via the fluid connection provided by port 60. As such, selective motion of the first and second clutch pistons 42, 44 may be achieved by respectively manipulating the pressures of only the first and second apply volumes 48, 52.

Each dam and/or apply volume may be fluidly connected to a valve or annulus that may be used to control the flow and/or pressure of fluid within each respective volume. For example, as shown in FIG. 1, a first annulus 62 may control the fluid flow to the outer apply volume 48, a second annulus 64 may control the fluid flow to the inner apply volume 52, and a third annulus 66 may control the fluid flow to the connected outer and inner release volumes 50, 54.

Each clutch piston may additionally include a clutch spring (e.g., clutch springs 72, 74) that may be configured to return the piston to a disengaged state when no hydraulic forces are applied. For example, in an embodiment, the system may be capable of two pressure states: high and low. A low hydraulic pressure in the release volume and a high hydraulic pressure in the apply volume may cause the piston to translate toward and engage with the clutch sub-assembly. If the pressure in the apply volume is subsequently brought low, the pressures on either side of the piston would be balanced (i.e., no net hydraulic force), and the clutch spring would urge the piston back to its initial position apart from the clutch assembly.

Figure 2:
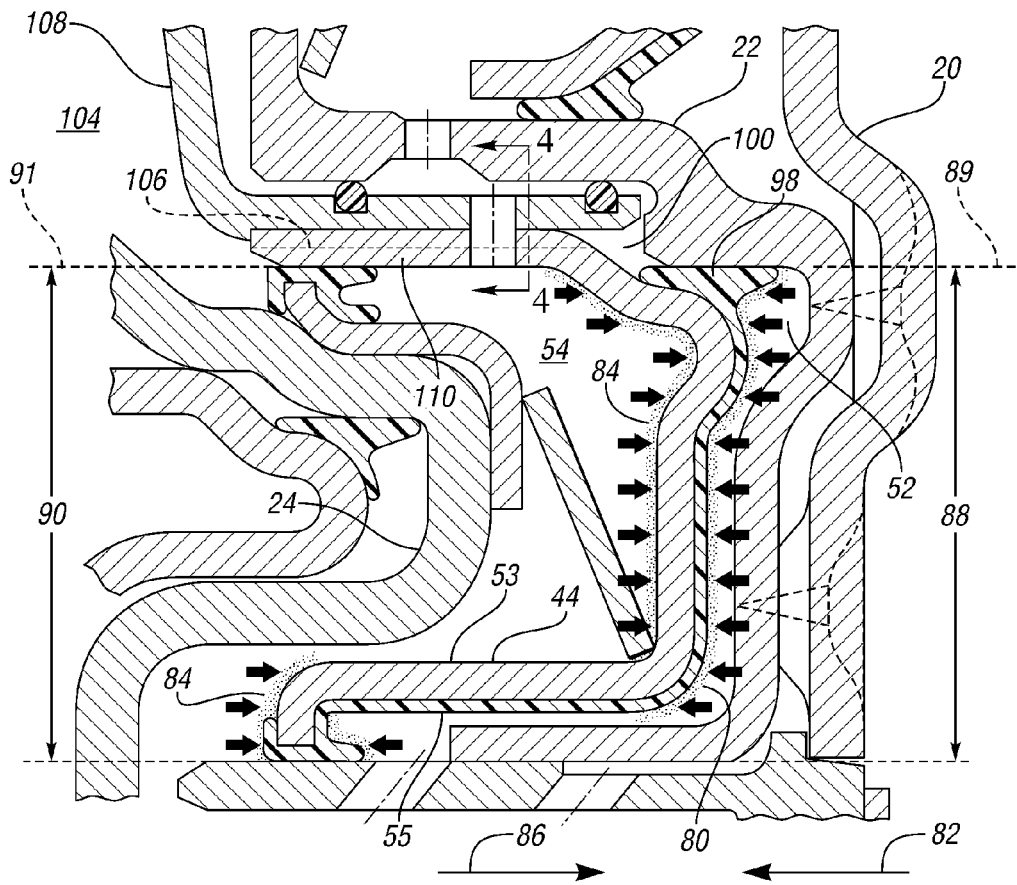
FIG. 2 is an enlarged view of the area designated "FIG. 2" shown in FIG. 1.

FIG. 2 is an enlargement of the area designated "FIG. 2" from FIG. 1, and illustrates, among other things, the inner clutch piston 44. As described above, the inner clutch piston 44 may partially reside in a chamber defined by hub 24 and piston dam 22, and may separate an inner apply volume 52 from an inner release volume 54, where each may be configured to contain a hydraulic fluid. The clutch piston 44 may have an inner surface 53 and an outer surface 55. The piston 44 may be configured so that a portion of the outer surface 55 faces the apply volume 52, and a portion of the inner surface 53 faces the release volume 54 (i.e., as used herein, a surface "faces" a volume if an outward normal vector of the surface is directed toward the volume). In an embodiment, a fluid within the apply volume 52 may exert a working pressure across an area 80 of the outer surface 55 of the piston 44 (i.e., the "fluid apply area" 80, or "apply area" 80). The apply area 80 may have a radial dimension 88 and a transverse dimension that may extend into and/or out of the drawing shown in FIG. 2. As may be appreciated, application of the working pressure to the apply area 80 may urge the piston 44 to translate in an engaging direction 82, which may be aligned with the axis of rotation 28 (shown in FIG. 1).

Figure 3A:
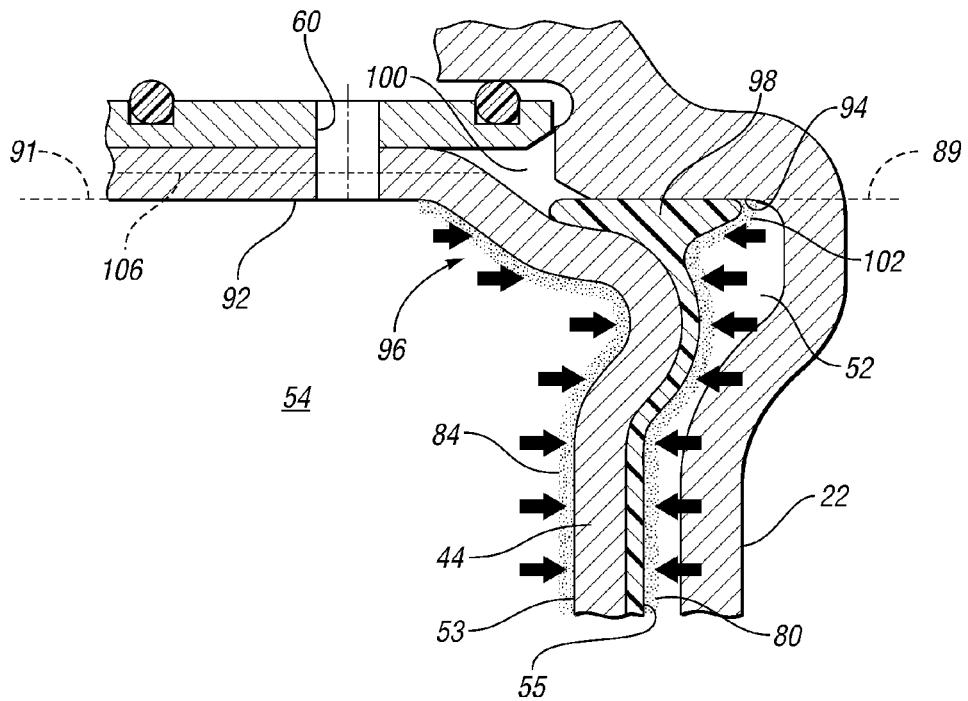
FIG. 3A is a schematic cross-sectional illustration of a portion of a clutch piston within a hydraulic chamber and in a disengaged state.
Figure 3B:
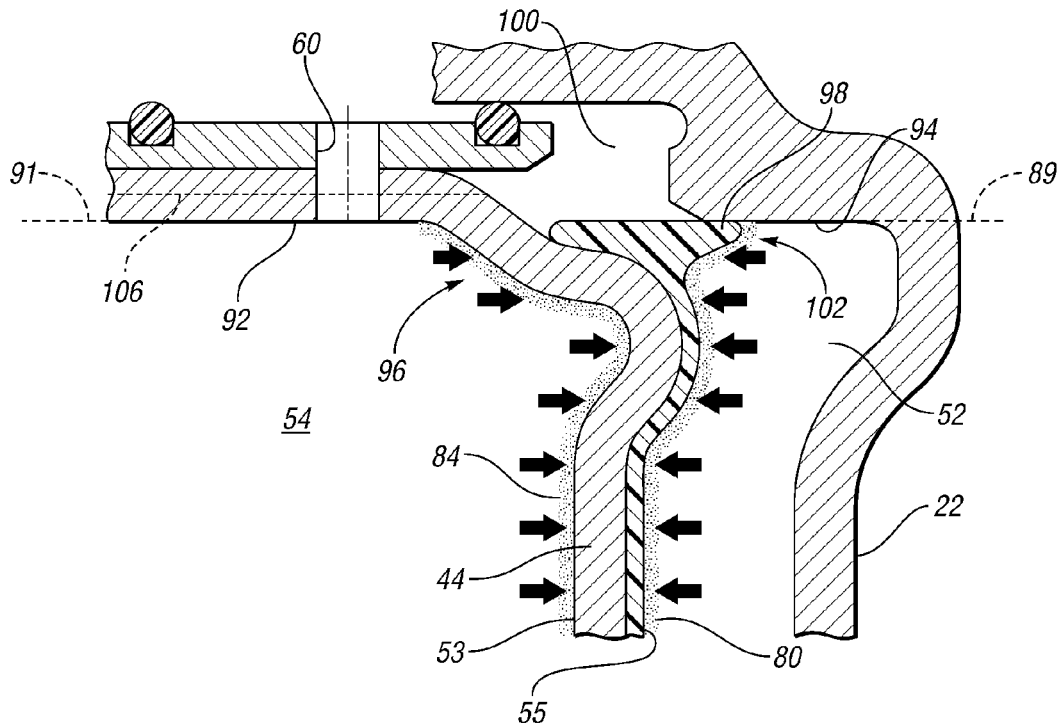
FIG. 3B is a schematic cross-sectional illustration of a portion of a clutch piston within a hydraulic chamber and in a engaged state.

Similar to the fluid in the apply volume 52, the fluid within the release volume 54 may exert a compensating pressure on an area 84 of the inner surface 53 of the piston 44 (i.e., the "fluid release area" 84, or "release area" 84). The release area 84 may have a radial dimension 90 and transverse dimension that may extend into and/or out of the drawing shown in FIG. 2. As may be appreciated, application of the compensating pressure to the release area 84 may urge the piston 44 to translate in a disengaging direction 86, which may substantially oppose the engaging direction 82. FIGS. 3A-3B generally illustrate a piston 44 in two positions along a common axis of translation. As shown, FIG. 3A may represent a piston 44 having been translated in a disengaging direction 86, and FIG. 3B may represent a piston 44 having been translated in an engaging direction 82.

Referring again to FIG. 2, the piston 44 and surrounding components may be configured so that for each portion of the apply area 80, there is a corresponding portion of the release area 84 at the same radial distance on the opposite side of the piston 44. In this configuration, the apply area 80 may extend to an extreme radial dimension 89 that is substantially aligned with an extreme radial dimension 91 of the release area 84. By aligning the respective apply and release areas 80, 84, the piston may be centrifugally balanced. That is, during rotational operation of the clutch, the centrifugal pressure gradient of the fluid on one side of the piston will be matched by the centrifugal pressure gradient of the fluid on the other side of the piston.

As illustrated in more clarity in FIGS. 3A-3B, the extreme radial dimensions 89, 91 of areas 80, 84 may be substantially aligned if an inner surface 92 of the piston 44 is aligned with a surface 94 of the dam 22 that defines the extreme radial dimension 89 of the apply area 80. In an embodiment, this alignment may be facilitated by including an inflection feature 96 and seal 98 with the piston 44. As shown, the inflection feature 96 may include a bend, shoulder, indentation, or other suitable design feature that may serve to align the inner surface 92 of the piston 44 with the surface 94 of the dam 22. Likewise, the seal 98 may prevent hydraulic fluid from passing beyond the dam surface 94 and into the adjacent volume 100.

In the illustrated configuration, absent the seal 98, hydraulic fluid may be allowed to pressurize volume 100, which, in turn would increase the apply area 80 beyond the radial dimension 89. Without a corresponding expansion of the release area 84, the piston 44 may be centrifugally unbalanced (i.e., there wouldn't be a portion of the release area 84 located at the same radial distance as the portion of the apply area within volume 100). In general, rotational motion of the assembly may cause the pressures exerted by the hydraulic fluid to increase exponentially as a function of distance from the axis of rotation 28 and angular speed. Therefore, while the system may be at equilibrium when not rotating, absent the seal 98, the piston 44 may be urged to translate during rotation due to increasing forces applied through volume 100.

As shown in FIGS. 3A and 3B, the seal 98 may be configured to translate with the piston 44, and may have a protrusion 102 that extends away from the piston 44 and may provide for a greater range of piston travel.

While the inclusion of the seal 98 may provide for a centrifugally balanced configuration, in a stacked piston design with a common dam fluid supply, it also may serve to isolate the adjacent volume 100. As illustrated in FIGS. 3A and 3B, as the piston 44 translates away from the piston dam 22, volume 100 may expand. To avoid the creation of vacuum forces from the expanding volume 100, the volume 100 may be vented to a non-pressurized area through one or more components or passages. In an embodiment, volume 100 may be fluidly coupled to an adjoining cavity 104 through a relief port 106 provided within a portion of the piston 44. During an expansion of the volume 100, fluid from the cavity 104 may be allowed to pass through the port 106 into the volume 100, and correspondingly during a contraction of the volume 100, fluid may be allowed to exit the volume 100 via the port 106. The fluid may, for example, be a cooling or hydraulic fluid, or, the fluid may be air.

Figure 4:
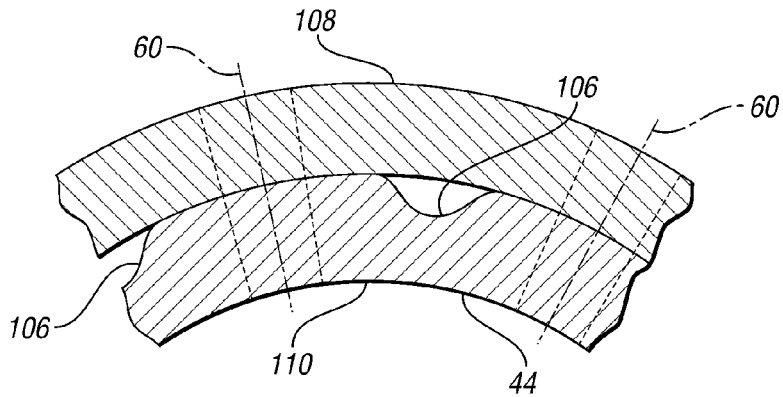
FIG. 4 is a cross-sectional view of a portion of clutch piston, taken along line 4-4 in FIG. 2.

FIG. 4 generally illustrates a cross-section of the inner clutch piston 44 shown in FIG. 2, and taken along line 4-4. As can be seen from FIG. 4, the piston 44 may have a radial curvature that may extend entirely, or a portion of the way around the axis of rotation 28. Note that FIG. 4 is shown for illustrative purposes and may not be to scale. In an embodiment, the clutch piston 44 may include a plurality of fluid ports 60 along its radial curvature that may allow the outer release volume 50 and the inner release volume 54 to share a common hydraulic fluid. Likewise, the clutch piston 44 may also include a plurality of relief ports 106 along its cross-section that may allow one or more volumes 100 to vent during the translation of the piston 44. The plurality of fluid ports 60 and relief ports 106 may be arranged through the piston 44 in a manner that may prevent any mixing of the fluids.

As further illustrated in FIGS. 1-4, in an embodiment, the inner clutch piston 44 may be formed by affixing multiple components or portions together. For example, as identified in FIGS. 2 and 4, the piston 44 may include an actuator portion 108 that is configured to engage the clutch sub-assembly, and a hydraulic portion 110 that may receive the hydraulic loading. As illustrated in FIG. 4, the relief port 106 may be provided as a channel formed into the surface of one (or both) of the two portions, such as for example, on the outer surface of the hydraulic portion 110. Alternatively, the hydraulic portion 110 and actuator portion 108 of the piston 44 may be formed as a unitary structure and the relief ports 106 may be drilled through the structure.

Referring again to FIG. 1, each clutch piston (e.g., clutch pistons 42, 44, 46) within the assembly 10 may be centrifugally balanced, and may include an inflection and seal (similar to the inflection 96 and seal 98 described above) to substantially align a radial extreme of the apply area 80 with a radial extreme of a release area 84.

Figure 5:
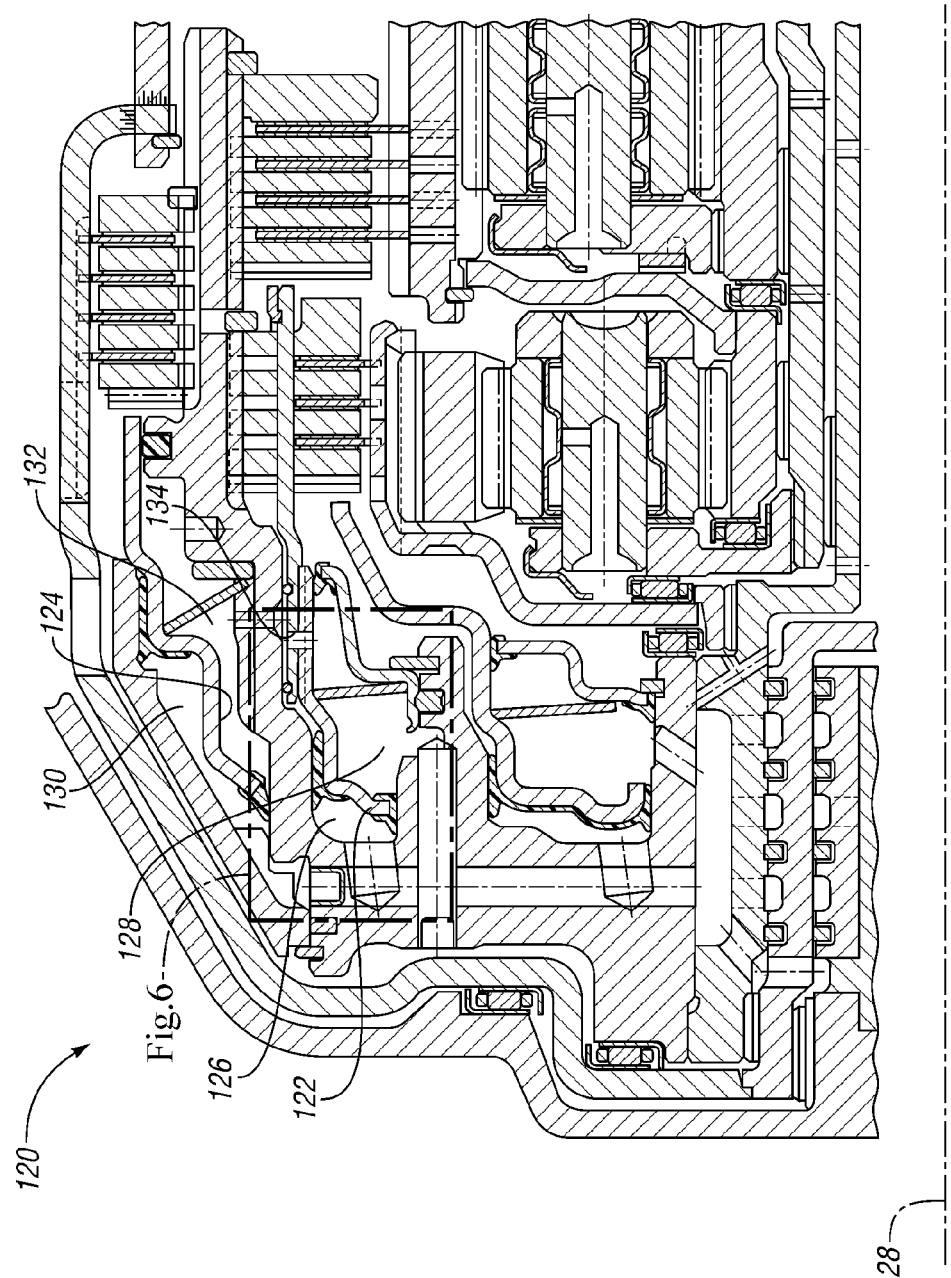
FIG. 5 is a partial schematic cross-sectional view of an embodiment of an automotive powertrain clutch assembly having a stacked clutch piston design.

FIG. 5 illustrates another exemplary embodiment of a centrifugally balanced hydraulic clutch assembly 120 having a radially stacked piston arrangement. Assembly 120 may function similar to the clutch assembly 10 described with reference to FIGS. 1-4, and may include at least an inner clutch piston 122 and an outer clutch piston 124. The inner clutch piston 122 may separate an inner apply volume 126 from an inner release volume 128, and the outer clutch piston 124 may separate an outer apply volume 130 from an outer release volume 132. In an embodiment, each of the apply volumes 126, 130 and release volumes 128, 132 may be filled with a hydraulic fluid. Additionally, the inner and outer release volumes 128, 132 may be fluidly connected through a fluid port 134 provided in a portion of at least the inner clutch piston 122.

Figure 6:
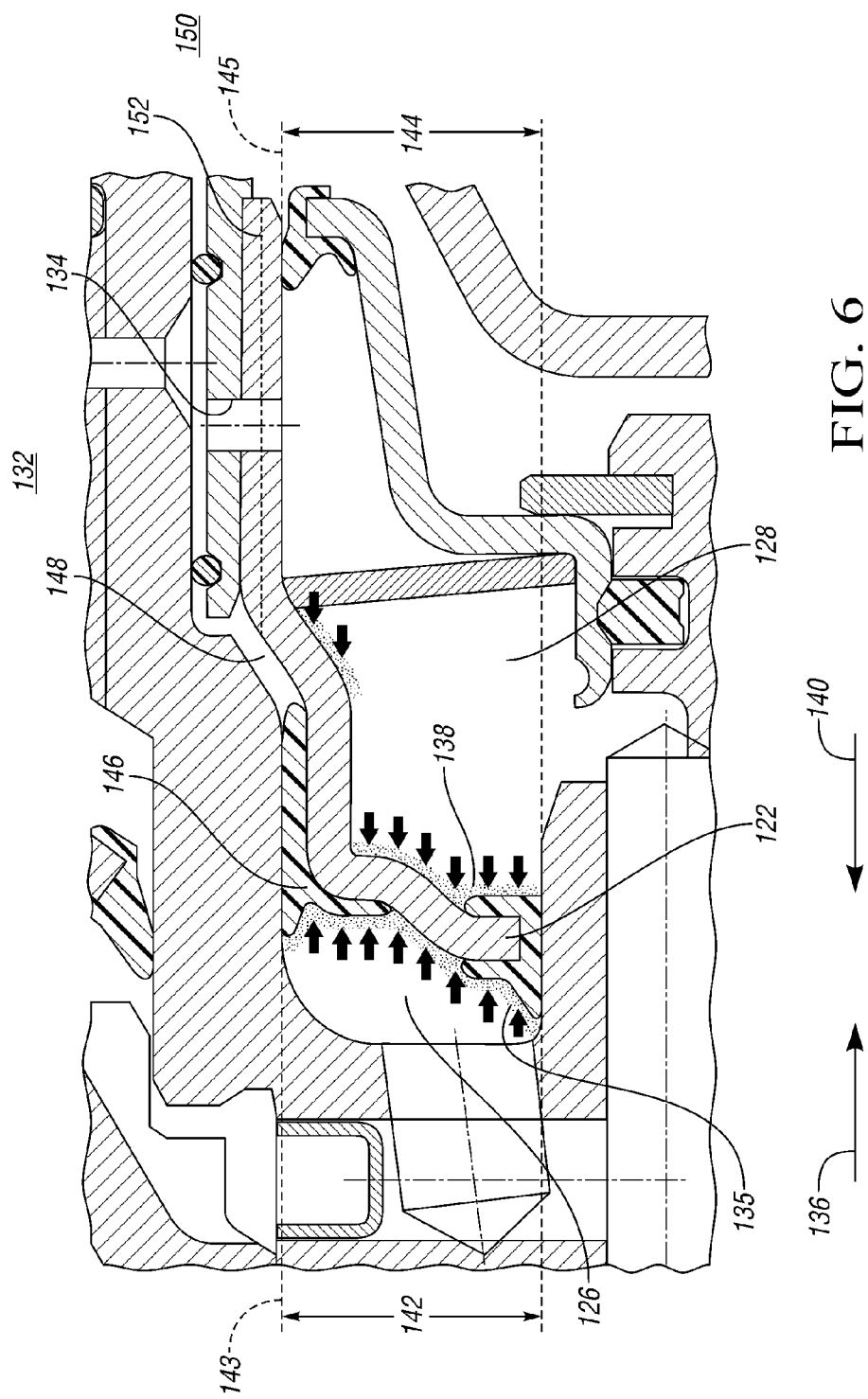
FIG. 6 is an enlarged cross-sectional view of the area designated "FIG. 6" shown in FIG. 5.

FIG. 6 is an enlargement of the area designated "FIG. 6" from FIG. 5, and further illustrates the inner clutch piston 122. The piston 122 may be configured so that a hydraulic fluid within the apply volume 126 may exert a working pressure on an area 135 of the piston 122 (i.e., the apply area 135), which may urge the piston 122 to translate in an engaging direction 136. Similarly, a hydraulic fluid within the release volume 128 may exert a dam pressure on an area 138 of the piston 122 (i.e., the release area 138), which may urge the piston 122 to translate in a disengaging direction 140 substantially opposing the engaging direction 136.

The piston 122 and surrounding components may be configured so that for each portion of the apply area 135, there is a corresponding portion of the release area 138 at the same radial distance on the opposite side of the piston 122. As such the radial dimension 142 of the apply area 135 may be similar to the radial dimension 144 of the release area 138. Additionally, the apply area 135 may extend to an extreme radial dimension 143 that is substantially aligned with an extreme radial dimension 145 of the release area 138. By aligning the respective apply and release areas 135, 138, the piston 122 may assume a centrifugally balanced configuration.

The assembly 120 may include a seal 146 that prevents hydraulic fluid in the apply volume 126 from entering/pressurizing a volume 148 adjacent the piston 122. As with the assembly 10 shown in FIGS. 1-4, the seal 146 may create a restriction that allows the apply area 135 to be maintained at the same size/alignment as the release area 138.

The adjacent volume 148 may be fluidly connected with an adjoining cavity 150 through a relief port 152 provided in a portion of the inner clutch piston 122. In an embodiment, the relief port 152 may be configured in a similar manner as the relief port 106 shown in FIG. 4. Similarly, multiple relief ports 152 may extend through the cross-section of the inner clutch piston 122 about the axis of rotation 28.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A centrifugally balanced, radially stacked hydraulic clutch assembly comprising:
    an inner hydraulic chamber and an outer hydraulic chamber, each hydraulic chamber being respectively configured to rotate about an axis of rotation, the inner hydraulic chamber being radially disposed between the outer hydraulic chamber and the axis of rotation;
    an inner clutch piston partially situated within the inner hydraulic chamber and defining both an inner apply volume and an inner release volume within the inner hydraulic chamber;
        wherein the inner clutch piston includes an inner surface and an outer surface, wherein a portion of the outer surface of the inner clutch piston faces the inner apply volume and defines an inner apply area, and wherein a portion of the inner surface of the inner clutch piston faces the inner release volume and defines a inner release area;

wherein each portion of the inner apply area is provided at a respective distance from the axis of rotation, and, for each portion of the inner apply area, there is a corresponding portion of the inner release area provided at the same radial distance;

an outer clutch piston partially situated within the outer hydraulic chamber and defining an outer apply volume and an outer release volume within the outer hydraulic chamber;

wherein the outer clutch piston includes an inner surface and an outer surface, wherein a portion of the outer surface of the outer clutch piston faces the outer apply volume and defines an outer apply area, and wherein a portion of the inner surface of the outer clutch piston faces the outer release volume and defines a outer release area;

wherein each portion of the outer apply area is provided at a respective distance from the axis of rotation, and, for each portion of the outer apply area, there is a corresponding portion of the outer release area provided at the same radial distance; and a piston dam;

wherein the inner release volume is in fluid communication with the outer release volume through a first port provided in the inner clutch piston;

wherein each of the inner clutch piston and outer clutch piston are movable relative to the piston dam;

wherein the piston dam separates the inner hydraulic chamber from the outer hydraulic chamber;

wherein the inner clutch piston and the piston dam cooperate to partially define the inner apply volume; and wherein the outer clutch piston and the piston dam cooperate to partially define both the outer apply volume and outer release volume wherein the inner clutch piston includes a seal adjacent the outer surface, the seal configured to slidably contact a surface of the piston dam and define a boundary of the apply volume; and wherein the piston dam and the inner clutch piston partially define an isolated volume adjacent the outer surface of the inner clutch piston, wherein the isolated volume is isolated from the inner apply volume by the seal; and wherein the isolated volume is vented through the inner clutch piston by a second port provided in the inner clutch piston.

2. The assembly of claim 1, wherein the inner apply area extends to an extreme radial dimension that is substantially aligned with an extreme radial dimension of the inner release area; and wherein the outer apply area extends to an extreme radial dimension that is substantially aligned with an extreme radial dimension of the outer release area.

3. The assembly of claim 1, wherein the inner surface of the inner clutch piston at an extreme radial dimension of the release area is aligned with the surface of the piston dam.

4. The assembly of claim 1, further comprising a clutch sub-assembly; and wherein the application of a pressure to the inner apply area urges the inner clutch piston to translate in an engaging direction and towards the clutch sub-assembly.

5. The assembly of claim 1, wherein the inner release volume is in fluid communication with the outer release volume through the piston dam.

6. The assembly of claim 1, further comprising a first annulus configured to control a first fluid flow into the outer apply volume, a second annulus configured to control a second fluid flow into the inner apply volume, and a third annulus configured to control a third fluid flow into both the inner release volume and the outer release volume.

* * * * *